(12) United States Patent
Winn

(10) Patent No.: US 7,233,801 B2
(45) Date of Patent: Jun. 19, 2007

(54) INFORMATION DELIVERY

(75) Inventor: John Michael Winn, Cambridge (GB)

(73) Assignee: Hypertag Limited, Cambridge (GB)

( * ) Notice: Subject to any disclaimer, the term of this patent is extended or adjusted under 35 U.S.C. 154(b) by 138 days.

(21) Appl. No.: 10/947,816

(22) Filed: Sep. 22, 2004

(65) Prior Publication Data
US 2005/0043043 A1 Feb. 24, 2005

Related U.S. Application Data

(63) Continuation of application No. PCT/GB03/01232, filed on Mar. 21, 2003.

(30) Foreign Application Priority Data
Mar. 27, 2002 (GB) ................................. 0207189.2

(51) Int. Cl.
H04Q 7/20 (2006.01)
(52) U.S. Cl. ................................ 455/456.5; 455/412.1; 455/414.1
(58) Field of Classification Search ............. 455/456.1, 455/412.1, 414.1, 237.1, 343.3, 343.4; 379/343
See application file for complete search history.

(56) References Cited

U.S. PATENT DOCUMENTS 6,526,275 B1 * 2/2003 Calvert ........................ 455/418
6,714,791 B2 * 3/2004 Friedman .................. 455/456.1
6,928,299 B1 * 8/2005 Rinne et al. ................. 455/555
2001/0055976 A1 * 12/2001 Crouch et al. .............. 455/456
2002/0032746 A1 3/2002 Lazaridis

FOREIGN PATENT DOCUMENTS

| GB | 2 352 588 | 1/2001 |
|---|---|---|
| WO | WO 99/17566 | 4/1999 |
| WO | WO 01/35600 | 5/2001 |
| WO | WO 01/44831 | 6/2001 |
| WO | WO 02/17180 | 2/2002 |
| WO | WO 02/076039 | 9/2002 |
| WO | WO 03/084169 | 10/2003 |

* cited by examiner

Primary Examiner—CongVan Tran
(74) Attorney, Agent, or Firm—Martin Fleit; Paul D. Bianco; Fleit Kain Gibbons Gutman Bongini & Bianco P.L.

(57) ABSTRACT

A beacon is placed at a specific location, such as a bus stop and has a local communicator which transmits a code to a mobile telephone. The code identifies a predetermined item of information stored on a remote server, such as a bus timetable document. This information is retrieved by the mobile telephone using its network communicator. The mobile telephone then transmits a copy of the information to the beacon which stores it in its cache and also displays the document to its user. A PDA, which lacks a network communicator, is then able to retrieve the cached information directly from the beacon using only its local communicator. The PDA then displays the bus timetable document to its user.

26 Claims, 1 Drawing Sheet

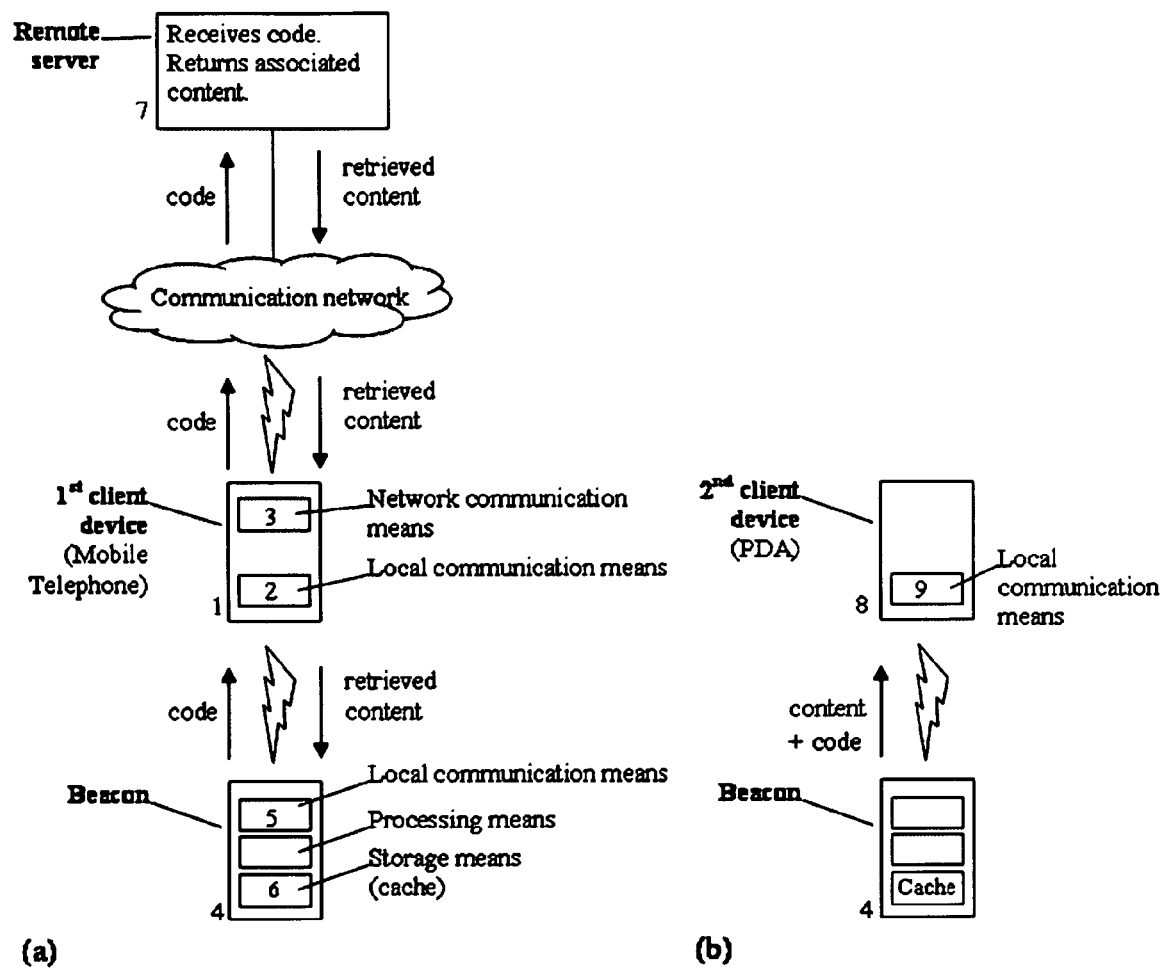

INFORMATION DELIVERY

RELATED APPLICATION

This application is a continuation of International Application Serial No. PCT/GB03/01232, filed Mar. 21, 2003, the contents of which are here incorporated by reference in their entirety; Applicant claims the benefit of 35 USC Section 120.

BACKGROUND OF THE INVENTION

1. Field of the Invention

This invention relates to a new system for efficient delivery of information and a method of providing efficient information delivery.

2. Prior Art

There are a number of current and proposed systems which allow information to be associated with a location. Some of these systems provide the location in terms of spatial co-ordinates using GPS (the satellite-based Global Positioning System) or cellular radio technologies (such as Cursor from Cambridge Positioning Systems Ltd.). Other systems provide the location in terms of proximity to one of a number of devices which are positioned on objects or in particular locations. Each such beacon device ("beacon") has a local communication means which allows it to pass information to client devices in the vicinity. This invention relates to this latter class of systems.

One difficulty with systems using a beacon is providing a means to update the information which it delivers. One approach is to give the beacon a communication system capable of connecting to a central network which allows it to retrieve and store information in integral storage. This results in a bulky, expensive device which consumes a considerable amount of power. For example, StreetBeam Inc. offer a Remote Access Mobile Point (RAMP), which is updated wirelessly, uses infrared to deliver information and is housed in a large, custom-built advertising panel.

The alternative is to store on the beacon, and transmit, only a reference to the required information and to rely on any network communication system of the client devices to map this reference to the desired information, and retrieve that information (see, for example, WO01/44831). This allows the beacon to be made very much smaller, cheaper and with very low power consumption. However, the client device then assumes both the cost and delay associated with retrieving the information.

In communication systems, it is common to use local caches to reduce the traffic on the central network and therefore reduce the associated cost and delay of information delivery. For example:

Web Browsers use a cache to store recently downloaded web pages.

Network cache servers allow multiple users to share one cache, thus reducing the amount of network traffic.

WideRay from WideRay Corporation is a network-connected beacon which caches the information which it transmits.

In all of these systems, the cache sits between the client and a central network and needs significant storage capacity to hold the variety of retrieved information.

SUMMARY OF THE INVENTION

It would be convenient to have the advantages of a small, lower power beacon without the associated cost and delay of retrieving the information over the network.

According to a first aspect of the present invention there is provided a local information delivery system comprising a beacon, wherein: i) the beacon has a memory adapted to store a code identifying a predetermined item of information; ii) the beacon has a local communications means adapted to transmit the code wirelessly to at least one client device when the at least one client device is in a vicinity of the beacon, the client device then using this code to upload the predetermined item of information by way of a global communications system; iii) the local communications means of the beacon is adapted to receive the uploaded item of information when transmitted from the at least one client device; iv) the beacon stores in its memory the item of information received or uploaded from the at least one client device; and v) the local communications means of the beacon is adapted to transmit the item of information, in place of or alongside the code, to at least one further client device when in the vicinity of the beacon.

In the context of the present application, the expression "local communications system" refers to a short-range, generally low power communications protocol such as Bluetooth IRDA or the like, which generally involves peer-to-peer direct communication between the beacon and a client device. The expressions "global communications system" or "network communications system", on the other hand, refer to a networked or other communications protocol allowing long-range communication between a client device and any other device (e. g. GSM, 3-G, GPRS, Internet or any other appropriate protocol), notwithstanding that some cellular networked communications system include a local communications step when transmitting between a client device and a local base station, for example.

Typically, the beacon does not have the capability to connect directly to a central network by way of the global communications system. In the course of normal usage, a client device retrieves the code from the beacon then uses its own global communications system to download related information from a central network. It then transmits a copy of this information back to the beacon which stores it in its cache. From that point onwards, the beacon is able to transmit the information in place of, or alongside, the stored code. Any subsequent client device can then retrieve the information directly from the beacon without having to connect to a central network.

Such a system is advantageous because: it allows the local information delivery system to deliver information to client devices which do not have their own network communication systems, or whose network communications system are currently inoperable (such as a wireless network in a train tunnel) it allows the local delivery system to update its information without requiring its own network communication system. This reduces the cost of the system, allowing a greater number of such systems to be installed and it allows connected client devices to retrieve the information without incurring the delay and cost of using their network communication system.

According to a second aspect of the present invention, there is provided a method of efficiently updating information stored in a beacon having a memory and at least one local communications means, in which: i) a client device retrieves or uploads a code from the beacon by way of the local communications means, the code identifying a predetermined item of information that is available over a network; ii) the client device uses a network communications system to retrieve or upload the predetermined item of information from the network and then transmits a copy of the item of information to the beacon using the local communications means; iii) the beacon stores the predetermined item of information in its memory; iv) other client devices then retrieve or upload the predetermined item of information directly from the beacon by way of the local communications means.

The client device may be of any common type, being for the purposes of this invention any device capable of using, storing, displaying or communicating the received information. It may, for example: communicate the information to a user via a screen or through an audio signal or by some other means; execute the information as a software application running on the device (for example, if the information was native machine code or Java byte codes or a script in a suitable scripting language); use the information to modify the behaviour of the device or any application software running on it; communicate the information to another device; store the information so as to use, display or communicate it at some point in the future.

Possible client devices include, but are not limited to, mobile phones, Personal Digital Assistants, cameras, other beacons, smart cards, printers, electronic locks or any standalone or personal electronic device, The local communication system may be of any type including, but not limited to, those using electromagnetic waves in the visible, infrared or radio-frequency parts of the spectrum, or emitting audible tones. The communication system used for transmitting from the client to the information delivery system may differ from the system used for transmitting from the information delivery system to the client.

The local memory or cache of the beacon may be of any type, including static and dynamic RAM or based on storage to any magnetic and/or optical medium.

Optionally, the beacon also monitors its memory (cache) to determine if the information is out of date. If so, the stored code may be transmitted instead of, or as well as, the stored information.

Optionally, the beacon may transmit additional information alongside the code, the information then being transmitted by the client device to a remote system. This allows, for example, information about the status and usage of the beacon to be passed to a central system for purposes which include maintenance and monitoring.

Optionally, the beacon may have multiple local communication means, so as to be able to communicate with client devices with differing local communication means.

For example, the beacon may have both an infrared and a Bluetooth (E) local communication system.

Optionally, the beacon may have sufficient storage to hold multiple versions of the referenced information. The client device could retrieve and transmit one or more of these versions in any given transaction. The versions could, for example, be the same information translated into several languages or formatted for different device capabilities. The beacon may then transmit an appropriate version depending on the detected capabilities of the client device or based on a direct request for a particular version received from the client device.

Optionally, the beacon may store multiple codes and determine which to transmit on the basis of the client request or the detected capabilities of the client.

Optionally, the beacon may have sufficient storage to hold information related to the referenced information. For example, if the information was an HTML document, the information linked to or from that document could also be sent to the client device and transmitted on to the delivery system. The delivery system may then transmit the related information to other client devices.

Optionally, the beacon may have additional storage capability, which may be read-only, in which static or rarely changing information may be stored. For example, there may be provided a memory card which can be physically removed and replaced. The beacon may then deliver a much wider range of information without requiring a network communication system.

Optionally, the information which the client device transmits to the beacon may originate from or be modified by the client device so as to provide a peer-to-peer communications capability. A second client device retrieving the information will then have effectively communicated with the first client device.

Optionally, a client device may be substantially the same as the beacon, allowing the client device to pass on data to further client devices in a peer-to-peer fashion.

Optionally, the beacon may only transmit the code when it detects that a client device is within range, so as to reduce power consumption. This may be achieved by requiring that the client device transmits a request code to the beacon before it will transmit its code.

BRIEF DESCRIPTION OF THE DRAWINGS

For a better understanding of the present invention and to show it may be carried into effect, reference shall now be made, by way of example, to the accompanying drawings, in which:

FIG. 1 shows an embodiment of the present invention in which Figure (a) shows a mobile telephone client device uses the beacon to retrieve information over a network, and Figure (b) shows a PDA then retrieves information directly from the beacon.

DETAILED DESCRIPTION OF PREFERRED EMBODIMENTS OF THE INVENTION

Referring firstly to FIG. 1(a), there is shown a mobile telephone 1 which contains a local communications means 2 (e.g. Bluetooth or ER-DA) and a network communication means 3 (e.g. GSM). A beacon 4 is positioned at a specific location.

The beacon contains a local communication means 5 which allows it to receive information from or transmit information to client devices in the vicinity of the beacon. The beacon is positioned at a specific location, which for the purpose of the present example may be taken to be at a bus stop in a public location. In this example, the code stored in the beacon identifies the timetable for buses stopping at the bus stop. The beacon also contains a cache 6 which allows it to store this information.

When a person arrives at the bus stop, he or she may use their mobile telephone 1 to retrieve the code from the beacon 4. When the telephone's local communication means 2 is within range of the beacon's local communication means 5, the telephone retrieves the code from the beacon. The telephone then transmits the code to a remote server 7 using its network communication means 3 and a standard network protocol. In addition, it transmits information about the mobile phone, such as its display capabilities.

The remote server 7 uses the received code (along with any other information received from the mobile telephone)

to retrieve the associated content information, in this case, a document containing the bus timetable for this bus stop. The mobile telephone then displays the document and also uses its local communication means 2 to transmit a copy to the beacon which stores it in its cache 6.

Referring now to FIG. 1(*b*), a second person arrives at the bus stop. This person has a personal digital assistant (PDA) 8 does not have a network communication means. It does, however, have a local communication means 9. By placing the local communication means 9 in range of the beacon, the PDA can retrieve both the code and the bus timetable document. The PDA 8 then displays the document. It may also store the code to allow an updated document to be retrieved at a later time, if required (for example, by connecting the PDA to a network-connected personal computer).

The preferred features of the invention are applicable to all aspects of the invention and may be used in any possible combination.

Throughout the description and claims of this specification, the words "comprise" and "contain" and variations of the words, for example "comprising" and "comprises", mean "including but not limited to", and are not intended to (and do not) exclude other components, integers, moieties, additives or steps.

The invention claimed is:

1. A local information delivery system comprising a beacon, wherein:
   i) the beacon has a memory adapted to store a code identifying a predetermined item of information;
   ii) the beacon has a local communications means adapted to transmit the code wirelessly to at least one client device when the at least one client device is in a vicinity of the beacon, the client device then using this code to upload the predetermined item of information by way of a global communications system;
   iii) the local communications means of the beacon is adapted to receive the uploaded item of information when transmitted from the at least one client device;
   iv) the beacon stores in its memory the item of information received or uploaded from the at least one client device; and
   v) the local communications means of the beacon is adapted to transmit the item of information, in place of or alongside the code, to at least one further client device when in the vicinity of the beacon.

2. A system as claimed in claim 1, wherein the client device is a mobile phone, a Personal Digital Assistant, a camera, another beacon, a smart card, a printer, an electronic lock, or a standalone or personal electronic device.

3. A system as claimed in claim 1, wherein the beacon includes a plurality of local communications means.

4. A system as claimed in claim 3, wherein the beacon transmits using a first local communications means and receives using a second, different, local communications means.

5. A system as claimed in claim 1, wherein the beacon stores multiple versions of the item of information in different formats.

6. A system as claimed in claim 1, wherein the beacon stores multiple versions of the code in different formats.

7. A system as claimed in claim 5, wherein the beacon senses predetermined characteristics of the client device by way of the local communications means and transmits a version of the item of information or code appropriate to the sensed characteristics of the client device.

8. A system as claimed in claim 1, wherein the beacon monitors its memory to determine if the item of information is out-of-date.

9. A system as claimed in claim 8, wherein the beacon is adapted to transmit the code as well as, or instead of, the item of information if the stored item of information is out of date.

10. A system as claimed in claim 1, wherein the beacon is operable to transmit additional information, together with the code, the additional information being information for further transmittal by the client device to a remote system.

11. A system as claimed in claim 1, wherein the beacon is operable to receive an item of information that originates from or is modified by a first client device, and to transmit the item of information to a second client device, thus providing peer-to-peer communications capability.

12. A system as claimed in claim 1, wherein the client device is another beacon.

13. A system as claimed in claim 1, wherein the beacon is provided with means for sensing when a client device is within a predetermined range of
   transmission, and wherein the beacon is operable only to transmit the code when a client device is within range.

14. A method of efficiently updating information stored in a beacon having a memory and at least one local communications means, in which:
   i) a client device retrieves or uploads a code from the beacon by way of the local communications means, the code identifying a predetermined item of information that is available over a network;
   ii) the client device uses a network communications system to retrieve or upload the predetermined item of information from the network and then transmits a copy of the item of information to the beacon using the local communications means;
   iii) the beacon stores the predetermined item of information in its memory;
   iv) other client devices then retrieve or upload the predetermined item of information directly from the beacon by way of the local communications means.

15. A method according to claim 14, wherein the client device is a mobile phone, a Personal Digital Assistant, a camera, another beacon, a smart card, a printer, an electronic lock, or a standalone or personal electronic device.

16. A method according to claim 14, wherein the beacon includes a plurality of local communications means.

17. A method according to claim 16, wherein the beacon transmits using a first local communications means and receives using a second, different, local communications means.

18. A method according to claim 14, wherein the beacon stores multiple versions of the item of information in different formats.

19. A method according to claim 14, wherein the beacon stores multiple versions of the code in different formats.

20. A method according to claim 18, wherein the beacon senses predetermined characteristics of the client device by way of the local communications means and transmits a version of the item of information or code appropriate to the sensed characteristics of the client device.

21. A method according to claim 14, wherein the beacon monitors its memory to determine if the item of information is out-of-date.

22. A method according to claim 21, wherein the beacon transmits the code as well as, or instead of, the item of information if the stored item of information is out of date.

23. A method according to claim 14, wherein the code is transmitted to the other client devices together with the item of information.

24. A method according to claim 14, wherein the beacon transmits additional information, together with the code, the additional information being transmitted further by at least one client device to a remote system.

25. A method according to claim 14, wherein the beacon receives an item of information that originates from or is modified by a first client device, and transmits the item of information to a second client device, thus providing peer-to-peer communications capability.

26. A method according to claim 14, wherein the client device is another beacon.

* * * * *